(12) United States Patent
Coates et al.

(10) Patent No.: US 7,790,810 B2
(45) Date of Patent: Sep. 7, 2010

(54) VINYL FUNCTIONAL OLEFIN POLYMERS

(75) Inventors: Geoffrey W. Coates, Ithaca, NY (US); Phillip D. Hustad, Manuel, TX (US)

(73) Assignee: Cornell Research Foundation, Inc., Ithaca, NY (US)

( * ) Notice: Subject to any disclaimer, the term of this patent is extended or adjusted under 35 U.S.C. 154(b) by 816 days.

(21) Appl. No.: 11/144,640

(22) Filed: Jun. 6, 2005

(65) Prior Publication Data
US 2005/0239966 A1 Oct. 27, 2005

Related U.S. Application Data

(63) Continuation-in-part of application No. PCT/US03/00043, filed on Jan. 24, 2003.

(51) Int. Cl.
*C08F 12/34* (2006.01)
(52) U.S. Cl. .................. 525/314; 526/336; 526/337
(58) Field of Classification Search ........... 526/336, 526/337; 252/314
See application file for complete search history.

(56) References Cited

U.S. PATENT DOCUMENTS

| | | | |
|---|---|---|---|
| 3,880,819 A * | 4/1975 | Natta et al. | 526/169.2 |
| 4,931,526 A | 6/1990 | Yoshitake et al. | 526/336 |
| 5,208,304 A | 5/1993 | Waymouth | 526/164 |
| 5,260,389 A * | 11/1993 | Resconi et al. | 526/160 |
| 5,387,664 A | 2/1995 | Kawasaki et al. | 526/336 |
| 6,455,649 B1 | 9/2002 | Fukui et al. | 526/169.2 |

OTHER PUBLICATIONS

Coates, Geoffrey et al., Journal of the American Chemical Society, 115(1), 91-8 (1993).*
Miyatake et al., Makromoleculare Chemie, Macromolecular Symposia, CAPLUS AN 1995:12506 (1994).*
Miyatake, Tatsuya et al., Makromol. Chem., Macromol. Symp. 66, 203-214 (1993).*
Hustad, Phillip D, et al., "Insertion/Isomerization Polymerization of 1,5-Hexadiene: Synthesis of Functional Propylene Copolymers and Block Copolymers", J. Am. Chem. Soc., vol. 124, No. 39, pp. 11578-11579, Sep. 4, 2002.

* cited by examiner

*Primary Examiner*—Jeffrey C Mullis
(74) *Attorney, Agent, or Firm*—Hodgson Russ LLP

(57) ABSTRACT

Vinyl functional olefin polymers are prepared by polymerizing hexadiene or copolymerizing $C_2$-$C_4$-$\alpha$-olefin, e.g., propylene, and hexadiene in the presence of a 2,1-insertion catalyst.

6 Claims, No Drawings

VINYL FUNCTIONAL OLEFIN POLYMERS

CROSS-REFERENCE TO RELATED APPLICATIONS

This is a continuation-in-part of PCT/US03/00043, filed Jan. 24, 2003.

TECHNICAL FIELD

The invention is directed at vinyl-functional hexadiene polymers and to vinyl functional poly($C_2$-$C_4$-α-olefin-co-hexadiene) copolymers and to block copolymers comprising block of polypropylene and block of vinyl functional poly(propylene-co-hexadiene) copolymer and to method of making these.

BACKGROUND OF THE INVENTION

Synthesis of functional polyolefins using Ziegler-Natta catalysts remains a longstanding scientific challenge. The two strategies most commonly employed toward this goal are direct copolymerization of olefins with functional monomers and post-polymerization modification. Direct copolymerization has met limited success due to catalyst poisoning and interactions of the catalyst with Lewis base monomers. Despite recent advances in C—H activation, modification of preformed polyolefins is also problematic due to the inert nature of the hydrocarbon polymer and lack of control over composition and microstructure. A third approach that has received attention in recent years involves controlled incorporation of a reaction moiety that provides easy access to a wide range of functionality through chemical modification. However, there remains room for a new strategy for the synthesis of functional olefin polymers.

SUMMARY OF THE INVENTION

It has been discovered herein that monodisperse vinyl functional olefin polymers can be synthesized through an unusual living insertion/cyclization/ring-opening polymerization approach.

In one embodiment, denoted the first embodiment, the invention herein is directed at a vinyl functional polyhexadiene polymer having a number average molecular weight ranging from 500 to 2,000,000 grams per mole, e.g., 100,000 to 400,000 grams per mole, and containing from 1 to 100 mol % 3-vinyl tetramethylene units and 99 to 0 mol % methylene-1,3-cyclopentane units.

In another embodiment, denoted the second embodiment, the invention is directed at a method for producing a vinyl functional polyhexadiene polymer comprising the step of polymerizing hexadiene selected from the group consisting of unsubstituted hexadiene and hexadiene substituted at any position with $C_1$-$C_6$ alkyl, at a temperature ranging from −80 to 150° C., preferably ranging from −50 to 80° C., more preferably ranging from −5 to 25° C., in the presence of a catalytically effective amount of a 2,1-insertion catalyst.

In still another embodiment, denoted the third embodiment, the invention is directed at a vinyl functional poly($C_2$-$C_4$-α-olefin-co-hexadiene) copolymer, e.g., a vinyl functional poly(propylene-co-hexadiene) copolymer, having a number average molecular weight ranging from 10,000 to 2,000,000 grams per mole, e.g., 50,000 to 250,000 grams per mole, and $M_w/M_n$ less than 3.0, e.g., less than 1.2, and containing from 1 to 99 mol % $C_2$-$C_4$ α-olefin units, e.g. propylene units, 1 to 99 mol % 3-vinyl tetramethylene units and 0 to 98 mol %, e.g., 0 to 50 mole %, methylene-1,3-cyclopentane units.

In yet another embodiment, denoted the fourth embodiment, the invention is directed at a method for producing a vinyl functional poly($C_2$-$C_4$-α-olefin-co-hexadiene) copolymer, e.g., vinyl functional poly(propylene-co-hexadiene) copolymer, comprising the steps of copolymerizing $C_2$-$C_4$-α-olefin and hexadiene selected from the group consisting of unsubstituted hexadiene and hexadiene substituted at any position with $C_1$-$C_6$ alkyl, at a temperature ranging from −80 to 150° C., preferably from −50 to 80° C., more preferably from −5 to 25° C., in the presence of a catalytically effective amount of a 2,1-insertion catalyst.

In still another embodiment, denoted the fifth embodiment, the invention is directed at a block copolymer comprising block of poly($C_2$-$C_4$-α-olefin), e.g., polypropylene having a number average molecule weight ranging from 10,000 to 2,000,000 gram per mole, e.g., 25,000 to 100,000 grams per mole, and block of vinyl functional poly($C_2$-$C_4$-α-olefin-co-hexadiene) copolymer, e.g., a vinyl functional poly (propylene-co-hexadiene) copolymer having a number average molecular weight ranging from 10,000 to 2,000,000 grams per mole, e.g., 25,000 to 100,000 grams per mole, and containing from 1 to 99 mol % $C_2$-$C_4$ α-olefin units, e.g., propylene units, 1 to 99 mol % 3-vinyl tetramethylene units, and 0 to 98 mol %, e.g., 0 to 50 mol %, methylene-1,3-cyclopentane units.

In still another embodiment denoted the sixth embodiment, the invention is directed at a method for preparing a diblock copolymer where one block is constituted of syndiotactic polypropylene and the other block is constituted of vinyl functional poly (propylene-co-hexadiene) copolymer, comprising the steps of polymerizing propylene at a temperature ranging from −80 to 150° C., preferably from −50 to 80° C., more preferably from −5 to 25° C. in the presence of a catalytically effective amount of a 2,1-insertion catalyst, and then adding hexadiene selected from the group consisting of unsubstituted hexadiene and hexadiene substituted with $C_1$-$C_6$ alkyl at any position to the polymerization mixture resulting from the polymerization of propylene alone which comprises syndiotactic polypropylene and forming a diblock copolymer by copolymerizing said hexadiene and propylene in the presence of the syndiotactic polypropylene and a catalytically effective amount of a 2,1-insertion catalyst, at a temperature ranging from −80 to 150° C., preferably from −50 to 80° C., more preferably from −5 to 25° C.

The molecular weights herein are determined by high temperature gel permeation chromatograpy (GPC) relative to polystyrene standards.

The term "2,1 insertion catalyst" is used herein to mean a catalyst which comprises or generates a metal alkyl compound which reacts with an α-olefin in such manner that the α-olefin is inserted into the metal alkyl bond to form a new metal alkyl species in which the metal becomes bound to the more substituted carbon of the α-olefin while the alkyl moiety becomes bound to less substituted carbon of the α-olefin.

The term "$C_2$-$C_4$-α-olefin" as used herein includes ethylene, propylene, 1-butene and isobutene.

DETAILED DESCRIPTION

We turn now to the first embodiment of the invention herein which is directed at a vinyl functional polyhexadiene polymer having a number average molecular weight ranging from 500 to 2,000,000 grams per mole, e.g., 100,000 to 400,000 grams per mole, and containing from 1 to 100 mol % 3-vinyl tetramethylene (VTM) units and 99 to 0 mol % methylene-1-3-cyclopentane (MCP) units, e.g., from 10 to 50% VTM units and from 90 to 50% MCP units. The polymer is represented by the structure

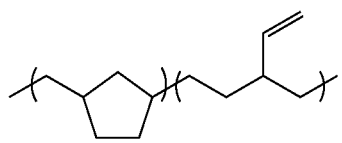

(I)

In a more limited case, the vinyl functional polyhexadiene polymer has a number average molecular weight ranging from 200,000 to 300,000 grams per mole and contains from 25 to 50 mol % 3-vinyl tetramethylene units and 75 to 50 mol % methylene-1,3-cyclopentane units.

The vinyl functional polyhexadiene polymer is soluble in common organic solvents, e.g., toluene, tetrahydrofuran and methylene chloride.

The vinyl functional polyhexadiene polymer can be prepared by the method of the second embodiment.

The vinyl functional hexadiene polymer is useful, for example, directly for making automobile and truck tires by crosslinking the pendant vinyl groups with sulfur.

We turn now to the second embodiment of the invention herein, which is directed at a method for producing a vinyl functional polyhexadiene polymer, e.g., the vinyl functional polyhexadiene polymer of the first embodiment, comprising the step of polymerizing 1,5-hexadiene selected from the group consisting of unsubstituted hexadiene and hexadiene substituted at any position with $C_1$-$C_6$ alkyl, at a temperature ranging from −80 to 150° C., preferably ranging from −50 to 80° C., more preferably from −5 to 25° C., in the presence of a catalytically effective amount of a 2,1-insertion catalyst.

The 2,1-insertion catalyst can be, for example, a fluorinated bis(phenoxyimine) catalyst or a beta-ketoiminato metal catalyst. A fluorinated bis(phenoxyimine) catalyst used in working examples herein has structure

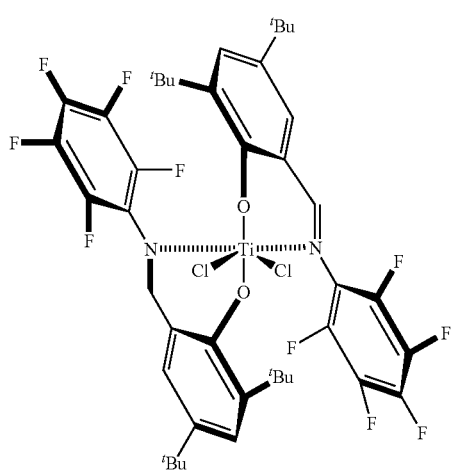

(II)

and is used in conjunction with a co-catalyst that causes generation of a metal alkyl compound from the 2,1-insertion catalyst, e.g., an aluminum containing activator. The catalyst (II) can be synthesized as described in Tian, J. et al, J. Am. Chem. Soc. 123, 5134-5135 (2001). The activator used in the Working Examples I and II herein, is methylaluminoxane. Alternatives for the methylaluminoxane are, for example, trialkylaluminum/fluorinated borate salts, e.g., i-$Bu_3Al$/ $Ph_3C^+B(C_6F_5)_4^-$; $Me_3Al/NHMe_2Ph^+B(C_6F_5)_4^-$; and $Me_3Al/B(C_6F_5)_3$.

Beta-ketoiminato metal catalysts used in Working Example III have the structure

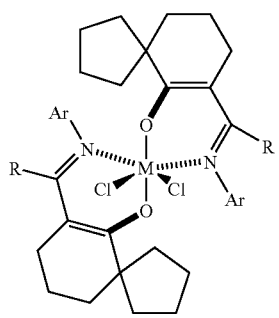

(IV)

where M is Ti and R and Ar are as set forth in Table 3 below. The catalysts (IV) can be preparedly described in U.S. Provisional Patent Application No. 60/602,320, the whole of which is incorporated herein by reference. The catalysts (IV) are used in conjunction with a co-catalyst that causes generation of a metal alkyl compound from the 2,1-insertion catalyst, e.g., an aluminum containing activator. The activator used in Working Example III herein, is methylaluminoxane. Alternatives for the methylaluminoxane are, for example, trialkylaluminum/fluorinated borate salts, e.g., i-$Bu_3Al$/ $Ph_3C^+B(C_6F_5)_4^-$; $Me_3Al/NHMe_2Ph^+B(C_6F_5)_4^-$; and $Me_3Al/B(C_6F_5)_3$.

Other 2,1-insertion catalysts are, for example, other bis (phenoxy)imine catalysts, other beta-ketoiminato metal catalysts as described in U.S. Provisional Patent Application No. 60/602,320 (the whole of which is incorporated herein by reference), vanadium based catalysts and bis(pyridyl) iron-based catalysts. These can be used in conjunction with the same cocatalysts as set forth in the above paragraph.

The amount of 2,1-insertion catalyst can range, for example, from 1 to $1 \times 10^{-6}$ mmol per mole of monomer. The cocatalyst is used in an activating, i.e., metal alkyl generating, effective amount and is used in at least an equivalent molar amount with respect to the catalyst and typically is used in large excess with respect to the catalyst. For example, in the case of methylaluminoxane, the aluminum containing activator used in the working example herein, the cocatalyst is used in an amount such that [Al]:[M] where Al is the aluminum in the cocatalyst and M is the metal in the catalyst, in terms of mole ratios, ranges from 1 to 20,0000:1, preferably from 10 to 2000:1, more preferably from 125 to 175:1.

The polymerization of the second embodiment is readily carried out in solution. Solvent to form the solution can be, for example, a common hydrocarbon solvent, including aliphatic and aromatic hydrocarbons or halogenated aliphatic and aromatic hydrocarbon solvents, most preferably, the solvent is an aromatic hydrocarbon, e.g., benzene, toluene or xylene. The amount of hexadiene present in solution can be, for example, 1 to 50 grams per 100 ml of solvent.

We turn now to the third embodiment of the invention herein, which is directed at a vinyl functional poly($C_2$-$C_4$-α-olefin-co-hexadiene) copolymer, e.g., a vinyl functional poly (propylene-co-hexadiene) copolymer or a vinyl functional poly(ethylene-co-propylene-co-hexadiene terpolymer), having a number average molecular weight ranging from 10,000 to 2,000,000 grams per mole, e.g., 50,000 to 200,000 grams per mole, and $M_w/M_n$ less than 3.0, preferably less than 1.2, and contains from to 1 to 99 mol % $C_2$-$C_4$-α-olefin units, e.g., propylene units or propylene and ethylene units, 1 to 99 mol % 3-vinyl tetramethylene units, and 0 to 98 mole %, e.g., 0 to 50 mol %, methylene-1,3-cyclopentane units. The copolymer of the third embodiment where the a-olefin is propylene, is represented by the structure

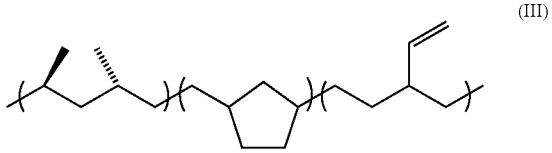

(III)

In a more limited case, the vinyl functional poly($C_2$-$C_4$-α-olefin-co-hexadiene) copolymer is the vinyl functional poly(propylene-co-hexadiene) copolymer having a number average molecular weight ranging from 100,000 to 175,000 grams per mole and containing from 80 to 98 mol % propylene units, 1 to 10 mole % 3-vinyl tetramethylene units and 1 to 10 mol % methylene-1,2-cyclopentane units. In the case where the copolymer contains at least 80 mol % propylene units, polypropylene is normally present in the copolymer as syndiotactic polypropylene.

In a different case of the third embodiment, the vinyl functional poly($C_2$-$C_4$-α-olefin copolymer) is vinyl functional poly ($C_2$-$C_4$-α-olefin-co-hexadiene) terpolymer, e.g., a vinyl functional poly(ethylene-co-propylene-co-hexadiene) terpolymer having a number average molecular weight ranging from 10,000 to 2,000,000 grams per mole, e.g., 50,000 to 200,000 gram per mole, and $M_w/M_n$ less than 3.0, e.g., less than 1.2, and contains from 1 to 98 mol % $C_2$-$C_4$-α-olefin units, 1 to 98 mol % different $C_2$-$C_4$-α-olefin units, 1 to 98 mol % 3-vinyl tetramethylene units, and 0 to 97 mol %, e.g., 0 to 50 mol %, methylene-1,3-cyclopentane units, e.g., 1 to 98 mol % ethylene units, 1 to 98 mol % propylene units, 1 to 98 mol % vinyl tetramethylene units, and 0 to 97 mol %, e.g., 0 to 50 mol %, methylene-1,3-cyclopentane units.

The vinyl functional poly($C_2$-$C_4$-α-olefin-co-hexadiene) copolymer can be prepared by the method of the fourth embodiment.

The vinyl functional poly(propylene-co-hexadiene) copolymer can be reacted with hydrophobic reagent to provide polypropylene substitute with better barrier properties (keeps oxygen out) or to polarity supplying agent to provide a printable polypropylene substitute or with agent that provides thermoplasticity. Other vinyl functional poly($C_2$-$C_4$-α-olefin-co-hexadiene) copolymers can also be reacted with hydrophobic reactant to provide better barrier properties or with a polarity supplying agent to provide a printable surface. The vinyl functional poly(ethylene-co-hexadiene) copolymers, the vinyl functional poly(propylene-co-hexadiene) copolymers and the vinyl functional poly(ethylene-co-propylene-co-hexadiene) terpolymers are also of use in the rubber industry.

We turn now to the fourth embodiment of the invention herein which is directed at a method for producing vinyl functional poly($C_2$-$C_4$-α-olefin-co-hexadiene) copolymer, e.g., a vinyl functional poly(propylene-co-hexadiene) copolymer or a vinyl functional poly (ethylene-co-propylene-co-hexadiene) terpolymer, e.g., a copolymer of the third embodiment, comprising the step of copolymerizing $C_2$-$C_4$-α-olefin(s) and 1,5-hexadiene selected from the group consisting of unsubstituted hexadiene and hexadiene substituted at any position with $C_1$-$C_6$ alkyl, at a temperature ranging from −80 to 150° C., preferably from −50 to 80° C., more preferably from −5 to 25° C., in the presence of a 2,1-insertion catalyst.

The 2,1-insertion catalysts and cocatalysts therefor can be those described for the second embodiment herein.

The amount of 2,1-insertion catalyst can range, for example, from 1 to 10×10$^{-6}$ mmol per mole of monomers. The cocatalyst is used in an activating effective amount and is used in at least an equimolar amount with respect to the catalyst and typically in large excess with respect to the catalyst. For example, in the case of methylaluminoxane, the aluminum containing activator cocatalyst used in the working example herein, the cocatalyst is used in an amount such that [Al]:[M] where Al is the aluminum in the cocatalyst and M is the metal in the catalyst, in terms of mole ratios, ranges from 1 to 20,0000:1, preferably from 10 to 2000:1, more preferably from 125 to 175:1.

The copolymerization of the fourth embodiment is readily carried out in solution. The solvent for forming the solution can be, for example, a common hydrocarbon solvent including aliphatic and aromatic hydrocarbon solvents, or a halogenated aliphatic or aromatic hydrocarbon solvent. Most preferably, the solvent is an aromatic hydrocarbon, e.g., benzene, toluene or xylene.

The amount of hexadiene present can be, for example, 5 to 50 gms per 100 ml of solvent. When the $C_2$-$C_4$-α-olefin is propylene, the relative amount of propylene can be controlled by carrying out the polymerization in a closed system and controlling the amount of propylene that enters the polymerization reaction by controlling the pressure of the polypropylene maintained in the closed system. The pressure of the polypropylene in the closed system can range, for example, from 1 psi to 2,000 psi, e.g. from 5 to 50 psi.

We turn now to the fifth embodiment of the invention herein which is directed at block copolymer comprising block of poly($C_2$-$C_4$-α-olefin), e.g., polypropylene, having a number average molecular weight ranging from 10,000 to 2,000,000 grams per mole, e.g., 25,000 to 100,000 grams per mole, and block of vinyl functional poly($C_2$-$C_4$-α-olefin-co-hexadiene) copolymer, e.g., poly (propylene-co-hexadiene) copolymer, having a number average molecular weight ranging from 10,000 to 2,000,000 grams per mole, e.g., 25,000 to 100,000 grams per mole and containing from 1 to 99 mol % $C_2$-$C_4$-α-olefin units, e.g., propylene units, 1 to 99 mol % 3-vinyl tetramethylane units, and 0 to 98 mol %, e.g., 0 to 50 mol %, methylene-1,3-cyclopentane units.

For example, the block copolymer can be poly(propylene-block-propylene-co-hexadiene), poly(ethylene-co-propylene-block-propylene-co-hexadiene) or poly(ethylene-block-propylene-co-hexadiene).

In one limited case, the block polymer is diblock copolymer with a block of propylene which is syndiotactic polypropylene and has a number average molecular weight ranging from 35,000 to 75,000 grams per mole and $M_w/M_n$ less than 3.0, e.g., 1.2, and a block of vinyl functional poly(propylene-co-hexadiene) copolymer having a number average molecular weight ranging from 30,000 to 60,000 grams per mole and $M_w/M_n$ less than 3.0, e.g., less than 1.2, and contains from 75 to 95 mol % propylene units, 1 to 15 mol % 3-vinyl tetramethylene units and 1 to 10 mol % methylene-1,3-cyclopentane units.

The block copolymer of the fifth embodiment can be prepared by the method of the sixth embodiment, and obvious variants thereof can be used, for example, to provide more than 2 blocks.

The block copolymers of the fifth embodiment are useful to provide the same barrier property, printable surface and thermoplastic property as the copolymers of the third embodiment.

We turn now to the sixth embodiment of the invention which is directed at a method for preparing a diblock copolymer where one block is constituted of syndiotactic polypropylene and the other block is constituted of vinyl functional poly(propylene-co-hexadiene) copolymer, e.g., a diblock copolymer within the scope of the fifth embodiment, comprising the steps of polymerizing the propylene at a temperature ranging from −80 to 150° C., preferably from −50 to 80° C., more preferably from −25 to 5° C., in the presence of a catalytically effective amount of a 2,1-insertion catalyst, to form a polymerization mixture comprising syndiotactic polypropylene, and in a second step adding to the polymerization mixture hexadiene selected from the group consisting of unsubstituted hexadiene and hexadiene substituted with $C_1$-$C_6$ alkyl at any position and forming a diblock copolymer by copolymerizing said hexadiene and propylene in the presence of the syndiotactic polypropylene and a catalytically effective amount of a 2,1-insertion catalyst, at a temperature ranging from −80 to 150° C., preferably from −50 to 80° C., more preferably from −25 to 5° C.

The step of polymerization of propylene alone is carried out in a closed system in a hydrocarbon or halogenated hydrocarbon solvent, e.g., aliphatic or aromatic hydrocarbon or halogenated aliphatic or aromatic hydrocarbon, preferably in an aromatic hydrocarbon solvent, e.g., benzene, toluene or xylene, and propylene is admitted as necessary to maintain a constant pressure of propylene in the closed system, and the molecular weight of the polypropylene product is controlled by controlling the pressure of propylene in the closed system and the time allowed for propylene polymerization. Propylene pressure in the system can range, for example, from 1 to 50 psi and polymerization times can range, for example, from 1 to 10 hours. The 2,1-insertion catalyst and cocatalyst for both steps are the same as described in conjunction with the second embodiment, and the amount of 2,1-insertion catalyst can range, for example, from 1 to $1 \times 10^{-6}$ mmol per mole of monomers for both steps, and where methylaluminoxane is the cocatalyst/activator, the amount of activator for both steps is such that [Al]:[M] where Al is the aluminum in the activator and M is the metal in the catalyst, in terms of mole ratios, ranges from 1 to 20,000:1, preferably from 10 to 2,000:1, more preferably from 125 to 175:1. The amount of hexadiene added in the second step can range, for example, from 5 to 50 gms per 100 ml of solvent. The pressure of the propylene in the system is maintained for producing the second block the same as in the polypropylene block producing step or can be varied from this within the range, for example, of 1 to 50 psi, to obtain desired composition for the second block. Copolymerization in the second step can be carried out, for example, over a time period ranging from 30 minutes to 10 hours.

The invention is illustrated by the following examples:

EXAMPLE I

Synthesis of Vinyl Functional Polyhexadiene and Vinyl Functional Poly(Propylene-Co-Hexadiene) Polymers Using Bis(phenoxy)imine Catalyst Polymerizations are performed in toluene at 0° C., total volume 100 ml with 20 μmol of the catalyst (II) and methylaluminoxane as activator in amount of [Al]:[Ti] mole ratio of 150:1 except that in the run with hexadiene above (entry 1 in Table 1 below) the amount of catalyst was 10 umol. Monomers, times of reaction, yields in grams, activities in terms of kg propylene per mol of catalyst titanium per hour except for entry 1 where activity is kg hexadiene per mole of titanium per hour, $M_n$ (number average molecular weight), $M_w/M_n$ (the polydisperity or weight average molecular weight divided by number average molecular weight) are given in Table 1. In Table 1 and in Example II, P means propylene, HD means hexadiene, MCP is methylene-1,3-cyclopentane and VTM is 3-vinyl tetramethylene. Entry 1 in Table 1 is directed to the polymerization of hexadiene with no propylene present. Entry 2 in Table 1 is directed to polymerization of propylene with no hexadiene present. Entries 3 and 4 in Table 1 are directed to copolymerization of hexadiene and propylene. Entry 5 of Table 1 is directed to first forming a block of polypropylene and converting this to a diblock copolymer where the second block is poly(propylene-co-hexadiene). In the runs of entries 4 and 5, polypropylene is present as syndiotactic polypropylene. In entry 5 of Table 1 where two values are given with a slash between, the first value is for the polypropylene block and the second value is for the final diblock copolymer.

In particular, the run of entry 1 of Table 1 was carried out as follows: A Schlenk-type flask equipped with a magnetic stir bar was charged with methylaluminoxane (0.29 g. 5.0 mmol), toluene (85 mL), and 1,5-hexadiene (11.0 g). The flask was equilibrated at 0° C. and catalyst (II) (0.018 g, 0.020 mmol, [Al]/[Ti]=250) in toluene (4 mL) was added via gas-tight syringe. After 20 min, the reaction was carefully quenched with methanol/HCl and the polymer was precipitated in copious methanol/HCl, filtered, washed with methanol, and then dried in vacuo to constant weight (0.67 g., $M_n$=268,000, $M_w/M_n$=1.27).

In particular, the run of entry 2 of Table 1 was carried out as follows: A 6-ounce Lab-Crest® pressure reaction vessel (Andrews Glass) equipped with a magnetic stir bar was first conditioned under dynamic vacuum and high temperature and then charged with methylaluminoxane (0.29 g, 5.0 mmol) and toluene (100 mL). The reactor was equilibrated at 0° C., the atmosphere was exchanged with propylene three times, and the propylene pressure was regulated at 10 psi. The catalyst (II) (0.018 g, 0.120 mmol, [Al]/[Ti]=250) in toluene (4 mL) was then added via gas-tight syringe. After 4 h, the reactor was vented and the polymer was precipitated in methanol/HCl, filtered, washed with methanol, and then dried in vacuo to constant weight.

In particular, the runs of entries 3 and 4 of Table 1 were carried out as follows: A 6-ounce Lab-Crest® pressure reaction vessel (Andrews Glass) equipped with a magnetic stir bar was first conditioned under dynamic vacuum and high temperature and then charged with methylaluminoxane (0.29 g, 5.0 mmol), toluene (85 mL), and 1.5-hexadiene (11.0 g). The reactor was the equilibrated at 0° C., the atmosphere was exchanged with propylene three times, and the solution was saturated under propylene pressure. The catalyst (II) (0.018 g, 0.020 mmol, [Al]/[Ti]=250) in toluene (4 mL) was then added via gas-tight syringe. After 4 h, the reactor was vented and the polymer was precipitated in methanol/HCl, filtered, washed with methanol, and then dried in vacuo to constant weight.

In particular, the run of entry 5 of Table 1 was carried out as follows: A 6-ounce Lab-Crest® pressure reaction vessel (Andrews Glass) equipped with a magnetic stir bar was first conditioned under dynamic vacuum and high temperature and then charged with methylaluminoxane (0.29 g, 5.0 mmol), toluene (85 mL). The reactor was then equilibrated at 0° C., the atmosphere was exchanged with propylene three times, and the solution was saturated under propylene pressure (10 psi). The catalyst (II) (0.018 g, 0.020 mmol, [Al]/

[Ti]=250) in toluene (4 mL) was then added via gas-tight syringe. After 4 h, a 5 mL sample of the polymerization medium was removed, quenched with methanol, and the polymer was filtered and dried in vacuo to constant weight ($M_n$=51,500, $M_w/M_n$-1.11). 1,5-Hexadiene (11.0 g) was then added to the reactor via gas-tight syringe. After another 2 h, the reactor was vented and the polymer was precipitated in methanol/HCl, filtered, washed with methanol, and then dried in vacuo to constant weight (0.98 g, $M_n$=93,300, $M_w/M_n$=1.11).

High temperature gel-permeation chromatography (GPC) was carried out as follows to determine $M_n$ and $M_w/M_n$ for Table 1. All analyses were performed with a Waters Alliance 2000 liquid chromatograph equipped with a Waters DRI detector and a Jordi styrene-divinylbenzene linear mixed-bed column. The GPC columns were eluted with 1,2,4-trichlorobenzene (TCB) containing 0.1 wt % Irganox 1010 at 140° C. at 1.0 mL/min and were calibrated using 23 monodisperse polystyrene standards. Polymer samples were typically placed in a 140° C. oven for 24 hours to eliminate supermolecular aggregates prior to molecular weight measurements.

The $T_g$ and $T_m$ values for Table were determined by differential scanning calorimeter (DSC) analysis. DSC analyses were performed on a Seiko DSC 220C instrument using EXSTAR 6000 processing software. The measurements were made in crimped aluminum pans under nitrogen with a heating rate of 10° C./min from −50-200° C., and reported values originate from the second heating scan. The sample containing 95% propylene (Table 1, Entry 4) was annealed at 80° C. for one hour to ensure sufficient time for crystallization.

Table 1 follows:

EXAMPLE II

Synthesis of Vinyl Functional Polyhexadiene Polymers Using Bis(phenoxy)imine Catalyst A Schlenk-type flask equipped with a magnetic stirring bar was charged with a PMAO (0.20 g, (3.5 mmol)), toluene (55 mL), and 1,5-hexadiene (2.1 g). The flask was equilibrated at −78° C. and $(F_5\text{-PHI})_2\text{TiCl}_2$ (0.010 g, 0.011 mmol, [Al]/[Ti]=320) in toluene (5 mL) was added via gas-tite syringe. The catalyst combination used was the same as used in Example I. After 4 hours and 45 minutes, the reaction was carefully quenched with methanol/HCl and then dried in vacuo to constant weight (0.020 g). $^1$H NMR spectrum of the resulting polymer exhibited the ratio of MCP to VTM unit at 78:22. At various temperatures (−50, 0, 22, and 70° C.), reactions were carried out by following the above procedure, and then $^1$H NMR spectra of the resulting polymers showed the ratio of MCP to VTM units in Table 2 below.

TABLE 2

| Temp | MCP:VTM |
| --- | --- |
| −78° C. | 78:22 |
| −50° C. | 74:26 |
| 0° C. | 63:37 |
| 22° C. | 61:39 |
| 70° C. | 58:42 |

TABLE 1

| | Feedstock | | Time | Yield | Activity (kg P/ | $M_n$ | | Composition (mol %) | | | $T_g$ | $T_m$ |
| --- | --- | --- | --- | --- | --- | --- | --- | --- | --- | --- | --- | --- |
| Entry | HD (g) | P (psi) | (min) | (g) | mol Ti° h) | (g/mol) | $M_w/M_n$ | P | MCP | VTM | (° C.) | (° C.) |
| 1 | 11.0 | 0 | 20 | 0.67 | 201 | 268,000 | 1.27 | 0 | 63 | 37 | −19.3 | 20 |
| 2 | 0 | 10 | 240 | 0.55 | 6.9 | 64,100 | 1.12 | 100 | 0 | 0 | | 146 |
| 3 | 11.0 | 10 | 240 | 1.17 | 14.6 | 119,000 | 1.16 | 87 | 8.3 | 4.7 | 2.8 | |
| 4 | 11.0 | 20 | 240 | 1.39 | 17.4 | 145,000 | 1.09 | 96 | 1.5 | 2.5 | 0.6 | 93.2 |
| 5 | 0/11.0 | 10 | 240/120 | 0.98 | 7.9 | 51,500/93,300 | 1.11/1.11 | 100/93 | 0/4.3 | 0/2.7 | 2.6 | 137 |

EXAMPLE III

Synthesis of Vinyl Functional Polyhexadiene Polymers Using Beta-Ketoiminato Metal Catalysts The amount of catalyst IV used was 0.01 mmol. The amount of PMAO used was 2.5 mmol ([Al]:[Ti] equal to 250). The polymerization was carried out with 25 mmol 1,5-hexadiene in 30 mL toluene at 0° C. The results are shown in Table 3 below, where R and Ar refer to structure (IV).

TABLE 3

| R | Ar | Time (h) | Yield (mg) | Activity (mol HD/(mol Ti h)) | $M_n$ (g/mol) | $M_w$ (g/mol) | $M_w/M_n$ | VTM % (%) |
| --- | --- | --- | --- | --- | --- | --- | --- | --- |
| $CF_3$ | Ph | 6 | 135 | 27.4 | 18,000 | 26,000 | 1.44 | 25 |
| $CF_3$ | 2,6-$F_2$Ph | 6 | 55 | 11.2 | 5,630 | 6,230 | 1.11 | 13 |
| H | Ph | 6 | 10 | 2.0 | 800 | 930 | 1.16 | — |
| H | 3,5-$F_2$Ph | 6 | 50 | 10.2 | 3,490 | 4,520 | 1.29 | 21 |
| H | $F_5$Ph | 6 | 14 | 2.8 | 640 | 800 | 1.25 | 17 |
| H | 2,6-$F_2$Ph | 1 | N/A | | | | | |

EXAMPLE IV

Synthesis of Poly(Ethylene-Co-Propylene)-Block-Poly(Propylene-Co-1,5-Hexadiene)

A 6 ounce Lab-Crest® pressure reaction vessel (Andrews Glass) equipped with a magnetic stir bar was first conditioned under dynamic vacuum and high temperature and then charged with methylaluminoxane (0.29 g, 5.0 mmol), toluene (35 mL). The reactor was then equilibrated at 0° C., the atmosphere was exchanged with propylene three times, and the solution was saturated under propylene pressure (29 psi). When the solution was saturated with propylene, a slight overpressure of ethylene (29 psi) was introduced and catalyst (II) (0.18 g, 0.020 mmol, [Al]/[Ti]=250) in toluene (4 mL) was added via gas-tight syringe. After 1 hour, a 5 mL sample of the polymerization medium was removed, quenched with methanol, and the polymer was filtered and dried in vacuo to constant weight (Mn=134,000 $M_w/M_n$=1.15). The reactor was vented and the liquid propylene was removed in vacuo (~5 min). Propylene (10 psi) and 1,5-hexadiene (10.0 mL) were then added to the reactor. After another 3.33 hour, the reactor was vented and the polymer was precipitated in methanol/HCl, filtered, washed with methanol, and then dried in vacuo to constant weight (4.36 g, $M_n$=267,000, $M_w/M_n$=1.27). $^1$H and $^{13}$C NMR reveal that the EPR domain contains ca. 50% ethylene, while the vinyl content of the total polymer is ca. 5%. Based on this data and other polymerizations, the poly(P-co-HD) block is considered to contain 5% VTM, 8% MCP, and 87% P.

Variations

Variations will be obvious to those skilled in the art. Thus, the scope of the invention is defined by the claims.

What is claimed is:

1. Vinyl functional polyhexadiene polymer having a number average molecular weight ranging from 10,000 to 2,000,000 grams per mole and consisting of from 5 to 42 mol % 3-vinyl tetramethylene units and 78 to 0 mol % methylene-1,3-cyclopentane units, optionally containing propylene units.

2. Vinyl functional poly($C_2$-$C_4$-α-olefin-co-hexadiene) copolymer having a number average molecular weight ranging from 10,000 to 2,000,000 grams per mole and Mw/Mn less than 3.0 and consisting of from 80-97 mol % $C_2$-$C_4$-α-olefin units, 2 to 10 mol % 3 vinyl tetramethylene units and 1 to 10 mol % methylene-1,3-cyclopentane units.

3. The vinyl functional poly($C_2$-$C_4$-α-olefin-co-hexadiene) copolymer of claim 2 which is a vinyl functional poly(propylene-co-hexadiene) copolymer having a number average molecular weight ranging from 100,000 to 175,000 grams per mole and consisting of from 80 to 97 mol % propylene units, 2 to 10 mol % 3-vinyl tetramethylene units and 1 to 10 mol % methylene-1,3-cyclopentane units.

4. Block copolymer comprising block of poly($C_2$-$C_4$-α-olefin) having a number average molecular weight ranging from 10,000 to 2,000,000 grams per mole and block of vinyl functional poly($C_2$-$C_4$-α-olefin-co-hexadiene) copolymer having a number average molecular weight ranging from 10,000 to 2,000,000 grams per mole and containing from 75 to 95 mol % propylene units, 1 to 15 mol % 3-vinyl tetramethylene units and 1 to 10 mol % methylene-1,3-cyclopentane units.

5. The block copolymer of claim 4 which is a diblock copolymer and the block of $C_2$-$C_4$-α-olefin is syndiotactic polypropylene having a number average molecular weight ranging from 35,000 to 75,000 grams per mole and $M_w/M_n$ less than 3.0, and the block of vinyl functional poly($C_2$-$C_4$-α-olefin-co-hexadiene) copolymer is vinyl functional poly(propylene-co-hexadiene) having a number average molecular weight ranging from 30,000 to 60,000 grams per mole and $M_w/M_n$ less than 3.0 and contains from 75 to 95 mol % propylene units, 1 to 15 mol % 3-vinyl tetramethylene units and 1 to 10 mol % methylene-1,3-cyclopentane units.

6. The vinyl functional polyhexadiene polymer of claim 1 which contains from 5 to 22% tetramethylene units.

* * * * *